(12) United States Patent
Brolli

(10) Patent No.: US 8,925,610 B2
(45) Date of Patent: Jan. 6, 2015

(54) ULTRASONIC WELDING DEVICE

(71) Applicant: Cavanna S.p.A., Prato Sesia (IT)

(72) Inventor: Elio Brolli, Prato Sesia (IT)

(73) Assignee: Cavanna S.p.A., Prato Sesia (Novara) (IT)

( * ) Notice: Subject to any disclaimer, the term of this patent is extended or adjusted under 35 U.S.C. 154(b) by 0 days.

(21) Appl. No.: 14/207,042

(22) Filed: Mar. 12, 2014

(65) Prior Publication Data

US 2014/0260088 A1 Sep. 18, 2014

(30) Foreign Application Priority Data

Mar. 18, 2013 (IT) .............................. TO2013A0206

(51) Int. Cl.
*B32B 37/00* (2006.01)
*B65B 7/02* (2006.01)
*B29C 65/08* (2006.01)

(52) U.S. Cl.
CPC ................. *B65B 7/02* (2013.01); *B29C 65/087* (2013.01); *B29C 65/086* (2013.01); *B29C 65/08* (2013.01)
USPC .......................... 156/515; 156/530; 156/580.2

(58) Field of Classification Search
USPC ............. 156/73.1, 269, 510, 515, 530, 580.1, 156/580.2
See application file for complete search history.

(56) References Cited

U.S. PATENT DOCUMENTS 7,060,142 B2 * 6/2006 Yamamoto .................... 156/73.1
8,172,971 B2 * 5/2012 Yamamoto .................... 156/73.1

FOREIGN PATENT DOCUMENTS

| DE | 10 2009002093 | 10/2010 |
|---|---|---|
| EP | 1609582 | 12/2005 |
| GB | 2482713 | 2/2012 |
| WO | 9721535 | 6/1997 |
| WO | 02102664 | 12/2002 |

OTHER PUBLICATIONS

Italian Search Report and Written Opinion for Application No. TO2013A000206 dated Nov. 20, 2013.

* cited by examiner

*Primary Examiner* — James Sells
(74) *Attorney, Agent, or Firm* — Patterson & Sheridan, L.L.P.

(57) ABSTRACT

An ultrasonic welding device for the transverse welding of a continuous chain of package blanks movable in a longitudinal direction, the continuous chain of package blanks including a continuous succession of products spaced apart in a longitudinal direction and wrapped in a tubular packaging film.

5 Claims, 3 Drawing Sheets

ULTRASONIC WELDING DEVICE

CROSS-REFERENCE TO RELATED APPLICATIONS

This application claims benefit of Italian patent application number TO2013A000206, filed Mar. 18, 2013, which is herein incorporated by reference.

BACKGROUND OF THE INVENTION

1. Field of the Invention

The present invention relates to an ultrasonic welding device for transverse welding in a flowpack packaging machine.

2. Description of Prior Art

Flowpack packaging machines form a continuous chain of package blanks movable in a longitudinal direction. The continuous chain of package blanks is formed by a continuous succession of products, spaced apart in the longitudinal direction, and wrapped in a tubular packaging film. A longitudinal welding device performs a continuous weld between two facing edges of the tubular packaging film along a direction parallel to the longitudinal direction along which the continuous chain of package blanks advances.

Downstream of the longitudinal welding device, a transverse welding device is provided, which carries out the welding of the tubular packaging film in a transverse direction relative to the feed direction. The transverse welds are spaced apart from each other by a length equal to the length of the individual packages. Generally, the transverse welding device also performs the transverse cutting of the packaging film between two adjacent welds forming the tail weld of a previous package and the head weld of a subsequent package.

The document EP-A-1421000 describes a flowpack packaging machine equipped with an ultrasonic longitudinal welding unit and an ultrasonic transverse welding unit. The ultrasonic transverse welding unit comprises a rotating sonotrode unit having at least two sonotrodes and a rotary anvil having at least two welding anvils. The sonotrode unit and the rotating anvil rotate about respective transverse axes relative to the direction of movement of the continuous chain of package blanks.

The rotating sonotrode is subject to an ultrasonic radial vibration, normally with a frequency between 20 and 50 kHz, which is manifested on the surface of the sonotrode facing a welding edge of the anvil. The vibration of the active surface of the sonotrode has variable amplitudes, approximately between 10 and 50 microns, and can be varied by adjusting the power of the ultrasonic generator.

While the longitudinal welding is carried out continuously over the entire length of the packaging film, in the transverse welding, the sonotrode-anvil contact with the packaging film occurs alternately between one product and the next, since it must allow the passage of the products through the transverse welding group between the successive welding lines.

For the execution of the transverse welding, the welding power is applied on a generatrix of a cylinder for the entire width of the tubular packaging film to be welded. The welding area is normally limited to a few millimeters, but the application of the welding power must take place simultaneously on the entire width of the welding line.

To obtain a good transverse welding result, a high power therefore needs to be used. This implies that in the initial point of contact, breakages can be created due to an excess of power or vibration amplitude.

SUMMARY OF THE INVENTION

The present invention aims to provide an ultrasonic welding device that eliminates the breakage risk on the transverse welding lines and which, at the same time, provides a complete and constant welding over the entire welding width.

According to the present invention, this object is achieved by an ultrasonic welding device having the characteristics forming the subject of claim 1.

The claims form an integral part of the technical disclosure provided in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
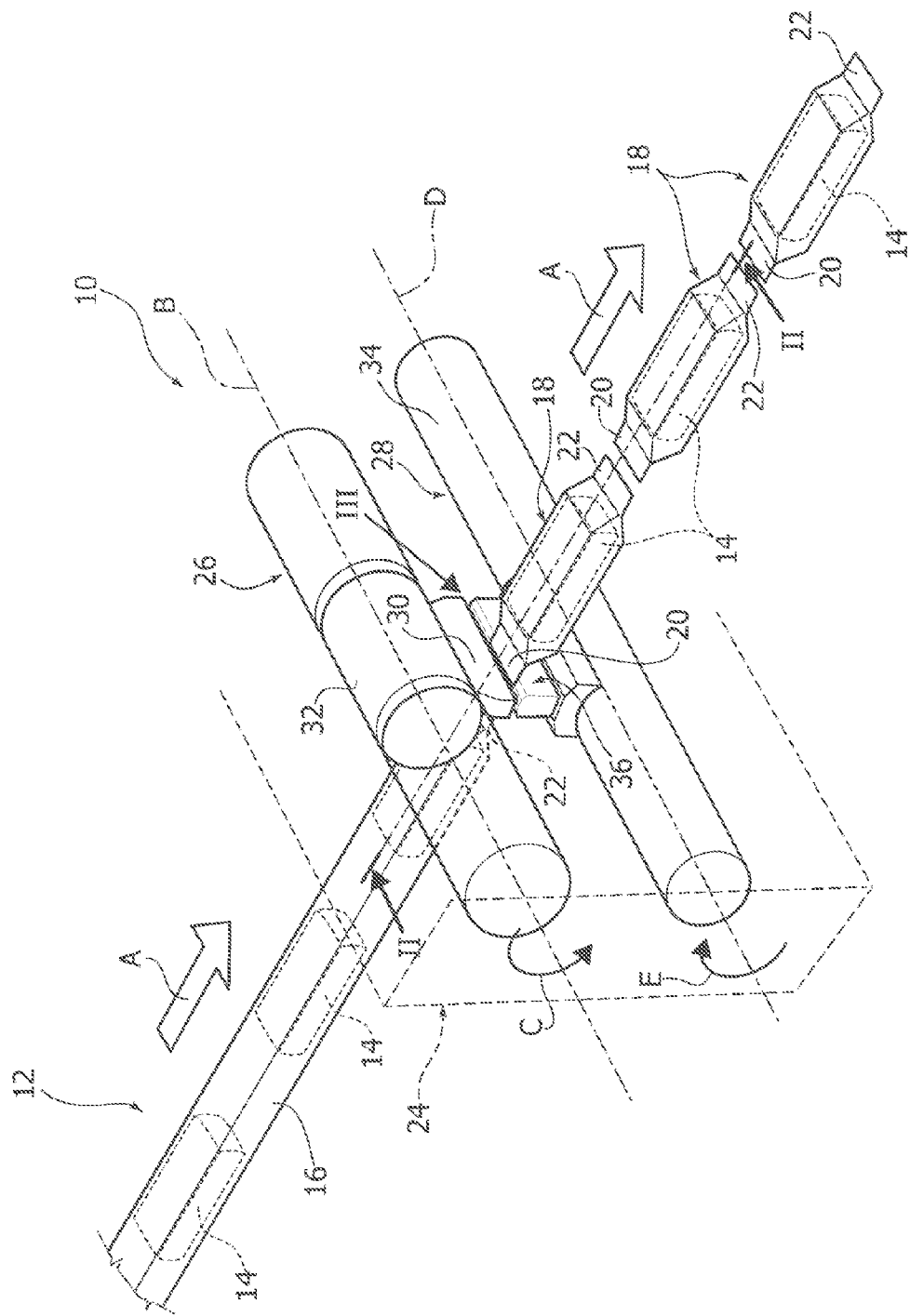
FIG. 1 is a schematic perspective view illustrating an ultrasonic welding device according to the present invention.
Figure 2:
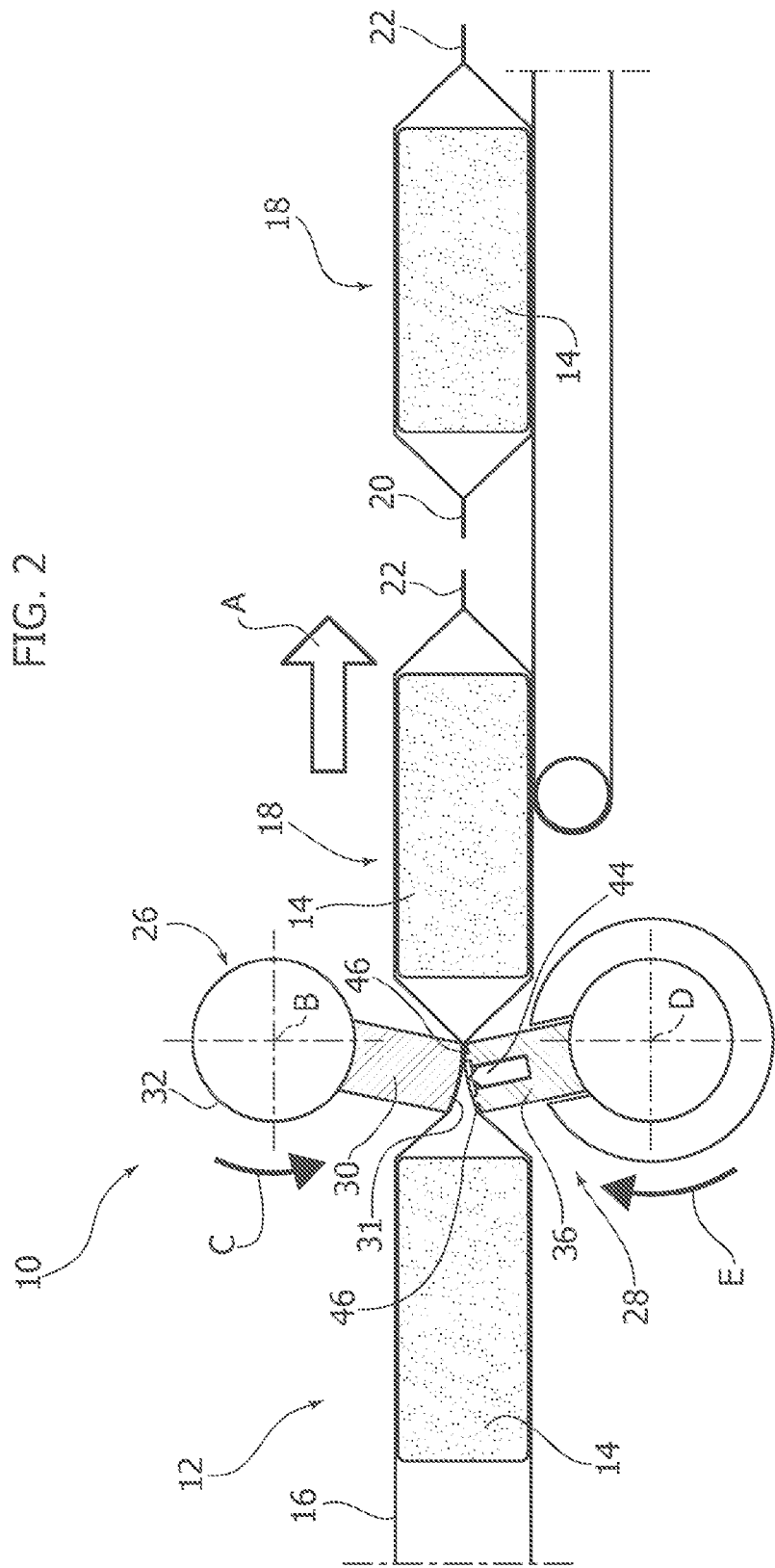
FIG. 2 is a schematic transverse section along the line II-II of FIG. 1.

With reference to FIGS. 1 and 2, numeral 10 indicates an ultrasonic welding device configured for carrying out the transverse welding in a flowpack packaging machine.

The flowpack packaging machine (not illustrated in the drawings) produces a continuous chain of package blanks 12, movable in a longitudinal direction A. The continuous chain of blanks 12 is formed by a continuous succession of products 14 spaced apart in the longitudinal direction A and wrapped in a tubular packaging film 16. The tubular packaging film 16 has two opposite longitudinal edges joined together by a longitudinal weld forming a continuous longitudinal fin.

The ultrasonic welding device 10 carries out the welding and the transverse cutting of the continuous chain of blanks 12, in order to form individual packages 18, closed at opposite ends by welds 20, 22.

The ultrasonic welding device 10 comprises a stationary support 24, which carries a sonotrode unit 26 and an anvil unit 28.

The sonotrode unit 26 comprises an ultrasonic generator associated with a booster, which amplifies the vibration amplitude produced by the ultrasonic generator. The booster is associated with a converter that transfers the ultrasonic vibration to at least one sonotrode 30, which protrudes radially from a sonotrode hub 32. The sonotrode hub 32 is rotatably mounted relative to the stationary support 24 about a first axis B transverse to the longitudinal direction A. The sonotrode 30 is fixed relative to the sonotrode hub 32 and rotates about the axis B in the direction indicated by the arrow C in FIGS. 1 and 2. The sonotrode unit 26 may be fitted with two or more sonotrodes 30 angularly offset from each other.

The anvil unit 28 comprises an anvil hub 34, which is rotatable relative to the stationary support 24 about a second axis D parallel to the first axis B. On the anvil hub 34 at least one anvil 36 is fixed, which rotates about the axis D in the direction indicated by the arrows E in FIGS. 1 and 2. The anvil unit 28 may be fitted with two or more anvils 36. The number of anvils 36 of the anvil unit 28 is equal to the number of sonotrodes 30 of the sonotrode unit 26.

Figure 3:
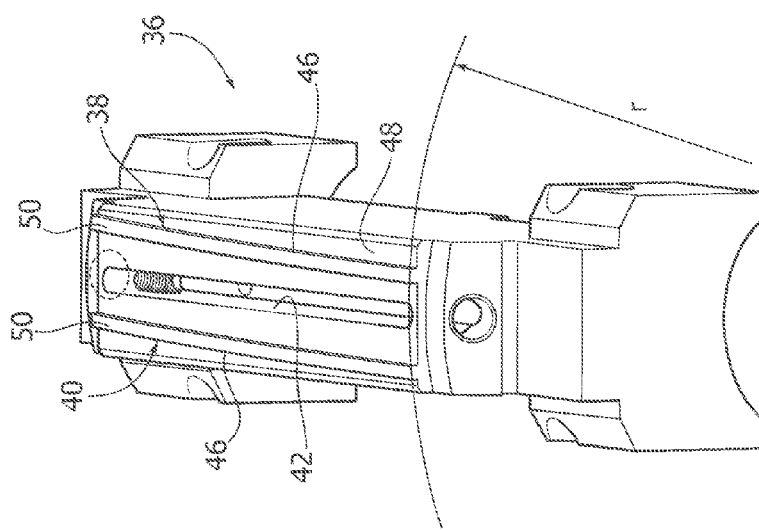
FIG. 3 is a perspective view of the anvil indicated by the arrow III in FIG. 1.
Figure 4:
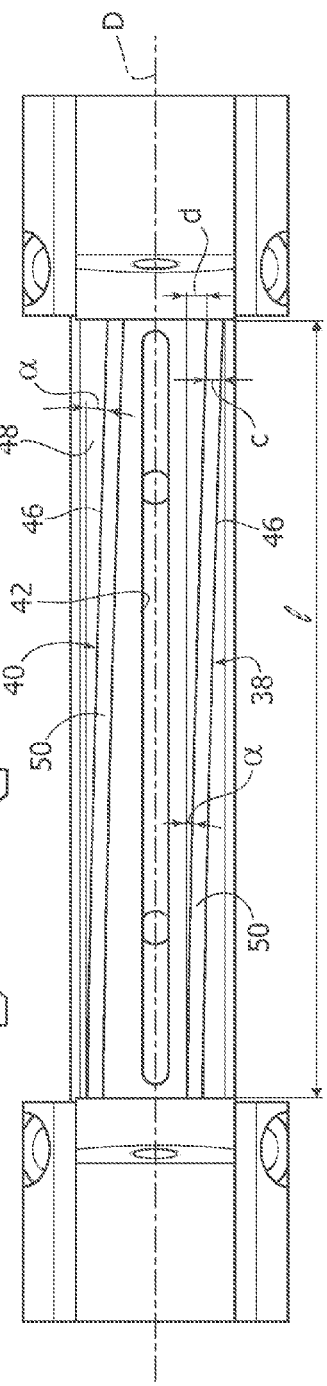
FIG. 4 is a plan view of the anvil of FIG. 3.

With reference to FIGS. 3 and 4, the anvil 36 has at least one welding portion which cooperates with a cylindrical welding surface 31 of the sonotrode 30 (FIG. 2) to carry out the transverse welding of the packaging film 16. In the embodiment illustrated in the figures, the anvil 36 has two welding portions 38, 40 that cooperate with the cylindrical welding surface 31 of the sonotrode 30. The welding portions 38, 40 of the anvil 36 respectively form the tail weld 20 and the head weld 22 of each package 18. Between the two welding portions 38, 40 of the anvil 36, a slot 42 is arranged, inside of which a blade 44 is housed (FIG. 2) that carries out the cutting of the packaging film 16 between two adjacent welds 20, 22.

Each welding portion 38, 40 includes at least one rib 46 that protrudes from an outer surface 48 of the anvil 36. Each welding portion 38, 40 may comprise two or more ribs 46 parallel to each other.

Each rib 46 has a welding surface 50 that extends along a helical path. The welding surface 50 of each rib 46 comes into contact with the packaging material film 16 at the opposite side to the welding surface 31 of the sonotrode 30. Each welding surface 50 is delimited between two helical lines parallel to each other, forming an angle α relative to the rotation axis D of the anvil unit 28.

Thanks to the helical arrangement of the contact surfaces 50, the application of the welding power from the sonotrode 30 to the anvil 36, through the packaging film 16, occurs in a progressive manner along the width of the film. In fact, the welding surface 50 does not simultaneously enter into contact with the welding surface 31 of the sonotrode 30, which would occur if the ribs 46 were parallel to the axis D. With an inclined arrangement of the ribs 46, the welding contact with the film 16 and with the sonotrode 30 occurs along a point that moves progressively from one end of the film 16 to the other, in a transverse direction.

In this way, the application of the welding power occurs in a progressive manner along the width of the film 16. This allows reduction of the power and the ultrasonic vibration amplitude of the sonotrode, and thus eliminates the breakage risk caused by an excessive power concentration on small areas of the film 16.

The helically arranged ribs 46 mean that the angle of rotation about the axes B and D during which the contact between the sonotrode 30, the anvil 36 and the film 16 takes place, is greater but with a lower contact area, which moves progressively from a side edge of the film 16 to the opposite edge in a progressive and constant manner.

This arrangement allows reduction of the area of the welding surfaces in contact with the film, and therefore reduction of the instantaneous power required to obtain the welding, obtaining a constant and progressive welding action.

As already indicated above, in the case in which more pronounced or larger welds are required, more ribs 46 may be provided for each welding portion 38, 40, thereby increasing the package portion dedicated to the transverse welding.

The pitch p of the helix of ribs 46 varies as a function of the radius of the contact surface and the width l of the welding area where:
r=radius of rotation of the anvil (FIG. 3);
l=width of the welding front (FIG. 4);
c=amplitude of the weld (FIG. 4);
d=distance between the start and end of the weld area on opposite sides of the anvil (FIG. 4);
α=angle of the helix (FIG. 4),
it follows that the pitch p of the helix is given by the following relationship:

$$p = tg\left(90 - \arctg\frac{c+d}{l}\right) * 2\pi r$$

where the inclination angle α can vary from 2° to 20°.

Of course, without prejudice to the principle of the invention, the details of construction and the embodiments may vary widely with respect to those described and illustrated, without departing from the scope of the invention as defined by the claims that follow.

The invention claimed is:

1. An ultrasonic welding device for transversally welding a continuous chain of package blanks movable in a longitudinal direction, the continuous chain of package blanks including a continuous succession of products spaced apart in a longitudinal direction and wrapped in a tubular packaging film, the ultrasonic welding device comprising:
a sonotrode unit including a sonotrode hub rotating about a first axis transverse to said longitudinal direction and at least one sonotrode projecting radially from said sonotrode hub; and
an anvil unit comprising an anvil hub rotating about a second axis parallel to said first axis and at least one anvil projecting radially from the anvil hub and having at least one welding portion cooperating with said sonotrode for transversely welding said continuous chain of package blanks along welding lines spaced apart along said longitudinal direction,
wherein:
said welding portion comprises at least one rib having a welding surface inclined relative to the longitudinal direction and the second axis such that welding contact with the film and the sonotrode occurs along a point that moves progressively from one end of the film to the other in a transverse direction, and
sides of the rib curve along an outer surface of the anvil hub.

2. A device according to claim 1, wherein said rib has an inclination relative to the second axis of the anvil unit between 2° and 20°.

3. A device according to claim 1, wherein the anvil comprises two welding portions and a blade for transversally cutting said packaging film arranged between said welding portions.

4. A device according to claim 1, wherein the anvil comprises two parallel welding portions.

5. A device according to claim 1, wherein the first axis and the second axis are aligned.

* * * * *